(12) United States Patent
Kirol et al.

(10) Patent No.: US 6,631,624 B1
(45) Date of Patent: Oct. 14, 2003

(54) PHASE-CHANGE HEAT TRANSFER COUPLING FOR AQUA-AMMONIA ABSORPTION SYSTEMS

(75) Inventors: Lance D. Kirol, Morrisville, VT (US); Paul Sarkisian; Uwe Rockenfeller, both of Boulder City, NV (US)

(73) Assignee: Rocky Research, Boulder City, NV (US)

( * ) Notice: Subject to any disclaimer, the term of this patent is extended or adjusted under 35 U.S.C. 154(b) by 0 days.

(21) Appl. No.: 09/709,875

(22) Filed: Nov. 10, 2000

(51) Int. Cl.$^7$ ............................................. F25B 15/00
(52) U.S. Cl. ..................... 62/324.2; 62/238.7; 62/476
(58) Field of Search ........................ 62/101, 476, 497, 62/485, 238.3, 238.7, 324.2, 141

(56) References Cited

U.S. PATENT DOCUMENTS

| | | | |
|---|---|---|---|
| 3,625,021 A | * 12/1971 | Dyre | 62/148 |
| 4,311,019 A | * 1/1982 | Rojey et al. | 62/101 |
| 4,903,761 A | 2/1990 | Cima | 165/104.25 |
| 5,174,129 A | * 12/1992 | Kondo | 62/476 |
| 5,367,884 A | 11/1994 | Phillips et al. | 62/101 |
| 5,375,650 A | 12/1994 | Mizuno | 165/40 |
| 5,456,086 A | 10/1995 | Hanna | 62/101 |
| 5,490,393 A | 2/1996 | Fuesting et al. | 62/101 |
| 5,548,971 A | 8/1996 | Rockenfeller et al. | 62/324.2 |
| 5,579,652 A | * 12/1996 | Phillips et al. | 62/476 |
| 5,799,502 A | 9/1998 | Nomura et al. | 62/476 |
| RE36,684 E | * 5/2000 | Rockenfeller et al. | 62/324.2 |
| 36,684 A | 5/2000 | Rockenfeller et al. | 62/324.2 |

FOREIGN PATENT DOCUMENTS

| | | |
|---|---|---|
| EP | 0 853 220 A2 | 7/1998 |
| JP | 11211150 | 8/1999 |

OTHER PUBLICATIONS

"Evaluation of a Commercial Advanced Absorption Heat Pump Breadbnoad", R. J. Modahl and F. C. Hayes, pp. 117–125, 1988.

* cited by examiner

*Primary Examiner*—William Doerrler
*Assistant Examiner*—Melvin Jones
(74) *Attorney, Agent, or Firm*—Knobbe, Martens, Olson & Bear, LLP

(57) ABSTRACT

An improved process for operating an aqua-ammonia absorption cooling system or heating and/or cooling system for supplying cooling to an indoor space, the system including a heat exchange assembly having a first heat exchanger exterior to the indoor space to be heated and/or cooled and a second heat exchanger using a phase-change refrigerant other than ammonia in heat transfer exposure with the interior of the indoor space, comprises pumping more liquid phase-change refrigerant from the refrigerant condensing heat exchanger to the refrigerant vaporizing heat exchanger than is required to meet the heat load transfer in the heat exchanger for vaporizing the phase-change refrigerant alone. The invention includes an apparatus for carrying out the process.

24 Claims, 8 Drawing Sheets

PHASE-CHANGE HEAT TRANSFER COUPLING FOR AQUA-AMMONIA ABSORPTION SYSTEMS

BACKGROUND OF THE INVENTION

Absorption heating and cooling systems, particularly air conditioners and heat pumps in which ammonia is the refrigerant and water the absorbent, are well-known as efficient and cost-effective alternatives to conventional vapor compression air conditioning and heat pump systems, as well as conventional furnaces. Cost savings of the aqua-ammonia systems driven by combustion of natural gas are significant compared to the conventional systems driven by more expensive electrical power. High-efficiency generator absorber heat exchange cycle (GAX) apparatus such as disclosed in Modahl, et al. "Evaluation of a Commercial Advanced Absorption Heat Pump Breadboard", 1988, and in U.S. Pat. Nos. Re. 36,684 and 5,367,884 are examples of further improvements in aqua-ammonia absorption systems. However, such ammonia refrigerant systems require the use of a hydronic heat transfer coupling or other heat exchange assembly for delivering heating and cooling to the living space because ammonia is excluded from use indoors in direct-expansion evaporators or indoor condensers. Ammonia is classified as a safety Group B2 refrigerant by ASHRAE and a Group II gas by UL. Moreover, local and national codes and regulations prohibit the use of ammonia in equipment exposed to indoor or other enclosed areas intended for occupation, except for small quantities.

In addition to aqua ammonia absorption systems, other heating or cooling systems using a working fluid that is restricted or prohibited for use in the conditioned space must have an isolated heat transfer assembly for transferring heating and cooling to the load. Heat exchange assemblies for coupling aqua-ammonia systems, and other refrigeration or heating systems, include pumped sensible heat loops, and phase-change loops. Pumped sensible heat loops utilize heat transfer fluids such a water, water-glycol solutions, brines, or oils. Hydronic (water based) loops are typically used with unitary aqua-ammonia absorption systems. Both phase-change and pumped systems have disadvantages. Hydronic heat transfer couplings commonly used for transferring cooling and heating from an aqua-ammonia system into a conditioned space utilize a pumped loop containing a solution of water and a heat transfer fluid such as ethylene glycol or propylene glycol. There are a number of disadvantages for using such water-based heat transfer coupling loops. Electrical power required for pumping water-based heat transfer fluid significantly increases operating costs. Retrofit of aqua-ammonia space conditioning equipment into existing buildings is difficult and expensive requiring replacement of indoor coils and piping typically designed for phase-change refrigerants and, thus, are not sized or designed properly for liquid heat exchange. The temperature glide of a water-based liquid as it exchanges heat between the conditioned space and the outdoor system forces the thermodynamic cycle to operate over an increased temperature lift, thereby reducing system efficiency. In addition, heat exchangers designed for liquid heat transfer are typically larger than those used with phase-change fluids.

Prior-art phase-change assemblies include thermosyphons and heat pipes, neither of which circulates more refrigerant than required to carry the heat load by phase change alone. Overfeed (or overpumping) is the process of circulating more refrigerant in a phase change system such than is required for the thermal load. Overfeed is commonly used in the evaporator loop of industrial and some commercial refrigeration systems with liquid refrigerant returning to a separation tank at the compressor inlet, but is not used in isolated heat transfer assemblies not communicating directly with a compressor. Overpumping has significant advantages in reducing heat transfer surface required, reducing pumping power, and in relaxing or eliminating restrictions on relative elevations of components. Heat pipes and thermosyphons both depend on gravity for circulation and orientation and location of components is important.

SUMMARY OF THE INVENTION

The present invention is directed to an improved heat transfer coupling designed to significantly reduce the disadvantages of the hydronic couplings presently used for aqua-ammonia absorption systems, as well as reducing the disadvantages of prior-art phase change coupling. The method and apparatus of the present invention utilize a phase-change refrigerant which is not prohibited nor its use substantially restricted for exchanging heat between the aqua-ammonia system and the indoor or occupied space to be conditioned. The invention includes specific overpumping of liquid phase-change refrigerant to the heat exchangers of the heat transfer coupling than is required to meet the heat exchange load transfer by phase change alone. A pumped phase-change loop with overpumping is a hybrid of a pumped sensible heat loop and pure phase change loop, and retains advantages of both while avoiding most of their disadvantages. Specific apparatus components and embodiments of the method are described in the following detailed description.

DETAILED DESCRIPTION OF THE PREFERRED EMBODIMENTS

Figure 1:
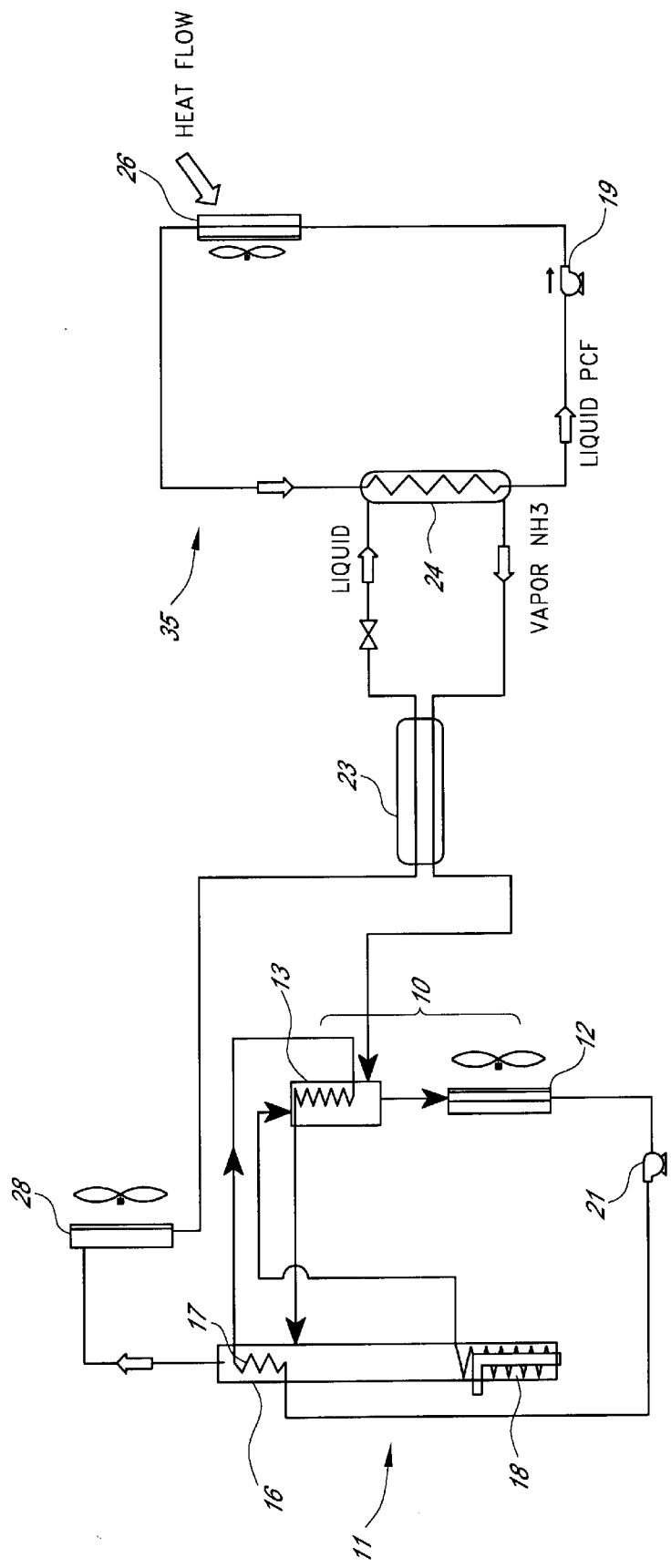
FIG. 1 is a schematic illustration of an aqua-ammonia absorption chiller showing phase-change heat transfer coupling to a conditioned space according to the invention.

FIG. 1 is a schematic illustration of an aqua-ammonia absorption chiller incorporating the phase-change heat transfer coupling to a conditioned space according to the invention. The aqua-ammonia absorption chiller components include an absorber assembly 12 and generator assembly 11. The absorber assembly comprises an absorber heat exchange section 13 and an air-cooled absorber 14. The generator assembly includes a generator heat exchanger 18 and a rectifier section 16 with a reflux coil 17. An air cooled condenser coil 28 condenses ammonia vapor received from the generator and the condensate is directed through the subcooler 23 to heat exchanger 24 where it is evaporated. Pump 21 pumps aqua-ammonia solution from the absorber to the generator. In the phase-change heat transfer coupling 35 liquid phase-change refrigerant is pumped to the indoor coil 26 by refrigerant pump 19. Liquid phase-change refrigerant from heat exchanger 24 is evaporated in the indoor coil 26 as it absorbs heat from the load and cools a space to which it is thermally exposed. Vapor-phase refrigerant from indoor coil 26 is directed to the heat exchanger 24 where the non-ammonia refrigerant is condensed by thermal contact with vaporizing ammonia which is fed to heat exchanger 24 as a liquid from condenser 28 and subcooler 23.

Figure 2:
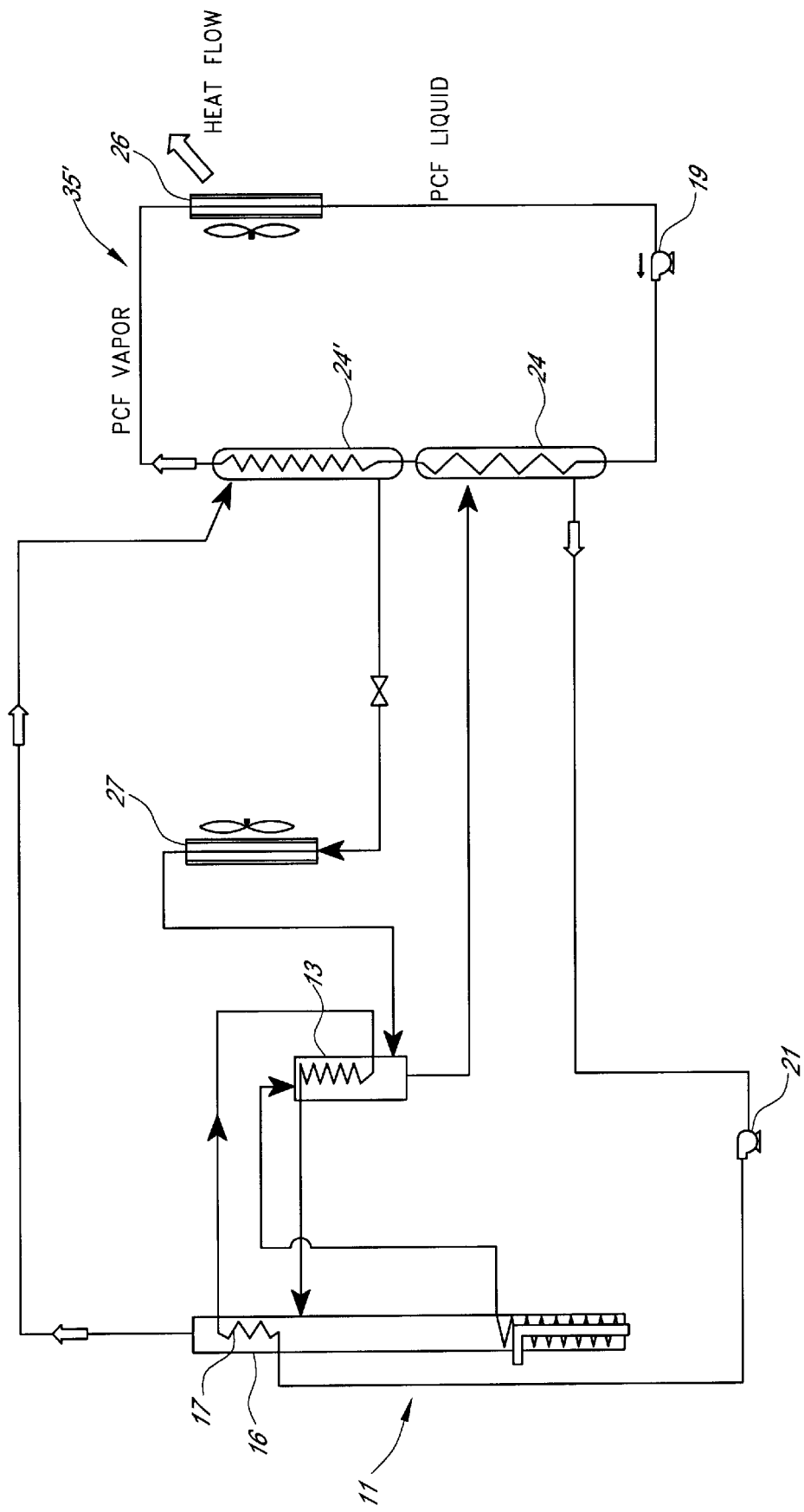
FIG. 2 schematically illustrates an aqua-ammonia heating-only appliance using phase-change coupling to the heated space.

FIG. 2 schematically illustrates a heating-only aqua-ammonia absorption appliance incorporating the phase-change coupling of the invention for providing heat to a space to be heated. The generator assembly components shown are similar to or substantially the same as described in the FIG. 1 assembly. The absorber assembly comprises absorber heat exchanger 13 and heat exchanger 24 which rejects heat of absorption to the liquid phase-change fluid. The absorber assembly also includes air coil ammonia evaporator 27. Aqua-ammonia absorption fluid is pumped by solution pump 21 as illustrated by the arrows. The phase-change heat transfer coupling 35' includes phase-change refrigerant heat exchanger 24'. Heat exchanger 24 vaporizes liquid phase-change refrigerant by heat transfer with absorbing aqua-ammonia solution from absorber heat exchanger 13. The phase-change refrigerant is then directed from heat exchanger 24 to heat exchanger 24' for further heating and vaporization by thermal contact with condensing ammonia vapor from rectifier section 16 of the generator assembly. Condensation of the phase-change refrigerant in the indoor coil 26 warms the space to be heated. In many situations the order of heat exchangers 24 and 24' may be reversed such that phase-change fluid passes through 24' first and then 24. Heat exchangers 24 and 24' may also be placed in parallel so that a portion of phase change fluid passes through 24 while the remaining portion passes through 24'.

Figure 3:
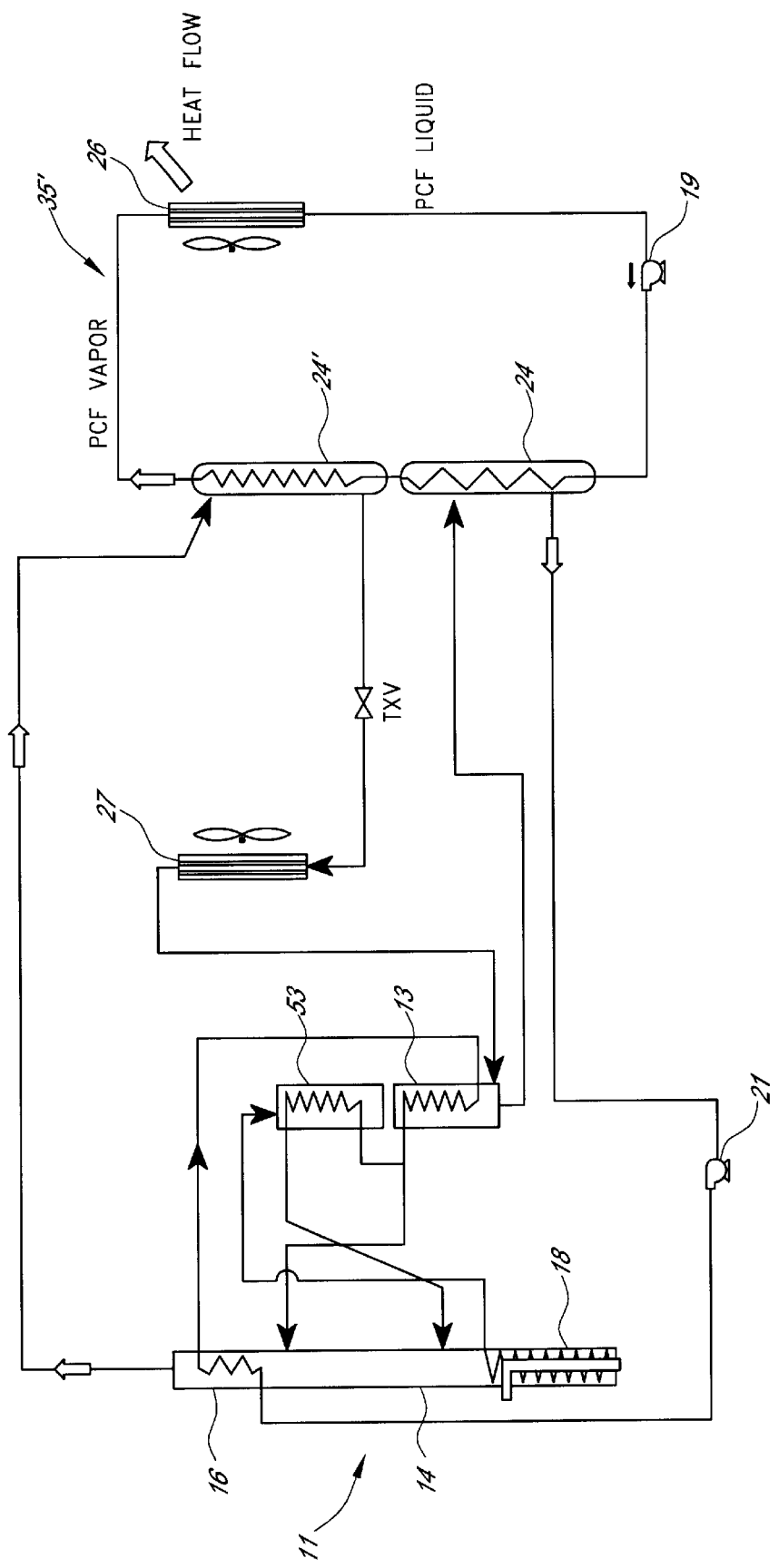
FIG. 3 schematically illustrates an aqua-ammonia GAX (generator absorber heat exchange) heating-only appliance incorporating the phase-change coupling.

FIG. 3 shows a GAX (generator absorber heat exchange) heating-only appliance with phase-change heat transfer coupling to a heated space. The aqua-ammonia absorption system illustrated comprises an absorber having an absorber heat exchanger 13, a GAX heat exchanger 53 and the heat exchanger 24. The generator assembly 11 is substantially as previously described and includes an adiabatic section 14 between the rectifier section 16 and the generator heat exchanger and boiler section 18. Operation of the GAX components including splitting the flow of ammonia rich absorption fluid (liquor) from the absorber heat exchanger with one portion directed to the GAX absorber and therefrom to a hotter section of the generator column and another portion directed to a cooler section of the generator column are well-known in the art, and described, for example, in the aforesaid Modahl, et al. publication and U.S. Pat. No. 5,367,884. Splitting flow of ammonia rich absorption fluid before the absorber heat exchanger is also common, with one portion going directly to the generator while the other portion passes through the absorber heat exchanger and is then directed to the GAX absorber, and therefrom to a hotter portion of the generator column. The components and operation of the phase-change heat transfer coupling assembly 35' is as described above regarding FIG. 2.

The schematic of FIG. 3 shows means of achieving generator-absorber heat exchange (GAX) by using ammonia-rich solution as the heat transfer fluid. Heat is transferred for the absorber to rich solution in the absorber heat exchanger 13 and GAX heat exchanger 53. In the GAX heat exchanger the rich solution temperature increases beyond its bubble point temperature, and partial vaporization and desorption occurs. This type of GAX is usually called rich-liquor or strong-liquor GAX. Other methods of achieving generator absorber heat exchange are known art. Such methods include using the ammonia-weak solution from the generator as the generator-absorber heat transfer fluid, usually called weak-liquor GAX. Fluids (such as water) in separate heat transfer loops can also be used to transfer heat from the absorber to the generator. Although the GAX heat transfer components illustrated and described in FIGS. 3, 4, 5 and 6 shows strong-liquor GAX, the present invention of using phase-change heat coupling to the conditioned space combined with over pumping, are applicable to all methods of GAX heat transfer and thus are equally valid with weak liquor or secondary fluid GAX.

The phase-change heat transfer coupling may also be used with an aqua-ammonia heat pump. Such an apparatus selectively supplies heating and cooling to a space to be conditioned. In addition to an absorber assembly and generator assembly of the aqua-ammonia absorption system, which may be GAX or non-GAX as will be discussed further hereinafter, and the phase-change heat transfer coupling, the heat pump assembly will incorporate an apparatus for selectively reversing the absorption cycle, such as one or more valves, and/or one-way or reversible pumps and suitable piping to provide for effective cycle selection. For a cooling phase, the aqua-ammonia absorption system will provide condensed ammonia to be vaporized in a heat exchanger of the phase-change heat transfer coupling; for a heating phase, ammonia vapor is directed from the absorption system to be condensed in the heat transfer coupling, and heat of absorption is also captured by the phase-change heat transfer coupling loop.

Figure 4:
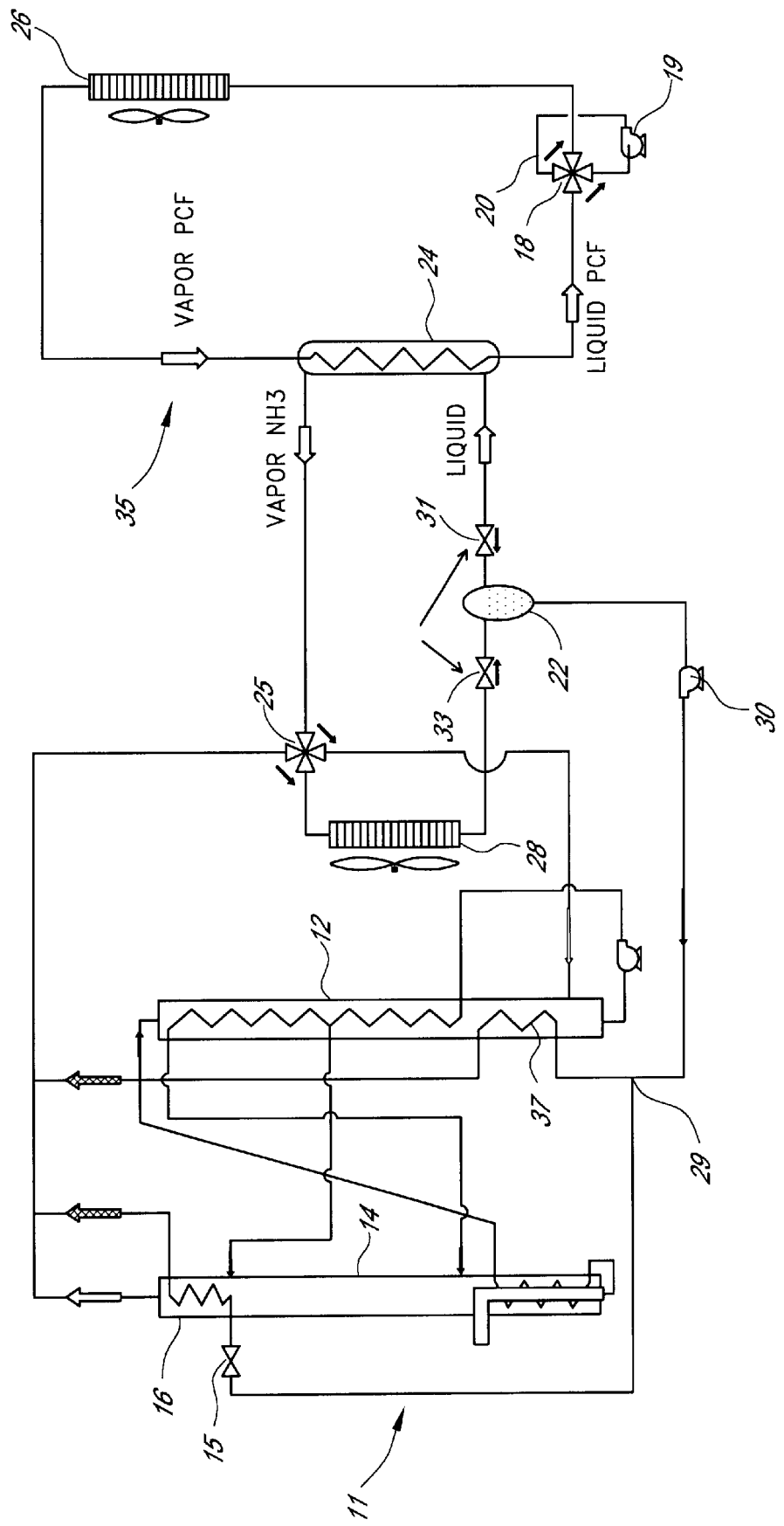
FIG. 4 is a schematic illustration of an aqua-ammonia absorption system heat pump operating in a cooling mode showing phase-change heat transfer coupling to a conditioned space according to the invention.

FIG. 4 is a schematic illustration of an aqua-ammonia absorption heat pump using a phase-change heat transfer coupling to the indoor or space to be conditioned. The aqua-ammonia absorption system heat pump illustrated is disclosed in U.S. Pat. No. Re. 36,684, the description and operation of which is incorporated herein by reference. Although the phase-change heat transfer coupling can be used with any form of heat pump such as those reversed hydronically as described in U.S. Pat. No. 5,579,652, it is especially useful in systems where all heat is rejected at a single point, as described in U.S. Pat. No. Re. 36,684. The system illustrated in FIG. 4 includes an absorber 12 and a generator 14 having a rectifier 16. A distributor may be used instead of the reflux coil shown. A pump 30 pumps liquid ammonia from reservoir 22, although gravity drive for the liquid ammonia refrigerant may instead be used as described in U.S. Pat. No. Re. 36,684. Condensed ammonia refrigerant from reservoir 22 is pumped to flow splitter 29 where it is directed to lower absorber heat exchanger 37 and to rectifier 16, the latter flow being regulated by valve 15. Ammonia (mostly vapor) from the rectifier and the absorber heat exchanger is then piped to reversing valve 25. In the embodiment illustrated in the cooling mode of operation, reversing valve 25 directs ammonia to outdoor coil 28 where it is condensed and piped to reservoir 22 via checkflowrator 33 or a one-way thermostatic expansion valve (TXV) or other flow restrictor. Liquid ammonia is piped from reservoir 22 through checkflowrator 31 to the phase-change refrigerant heat exchange assembly 35 as will be described further hereinafter. The checkflowrators 31 and 33 are full open with virtually no restriction in the direction of the arrows, and act as expansion devices in the opposite direction. The specific configuration of the absorption heat pump may be selected from any of those systems illustrated in U.S. Pat. No. Re. 36,684, including generator absorber heat exchange (GAX) including conventional commercially available single-effect and GAX chillers.

The phase-change heat transfer coupling assembly 35 includes a heat exchanger 24 in which heat is transferred between ammonia and a non-ammonia phase-change refrigerant. With the heat pump functioning in a cooling mode, ammonia is directed via reversing valve 25 through outdoor coil 28, acting as a condenser to reservoir 22, through expansion device 31 to heat exchanger 24. The heat transfer coupling assembly 35 includes an indoor coil 26 in heat transfer exposure with the interior of an indoor space or other area to be conditioned, a four-way valve 18, piping 20 and unidirectional pump 19 for selectively directing the phase-change refrigerant to and from the indoor coil. In the cooling mode, the four-way valve 18 and pump 19 direct liquid phase-change refrigerant from heat exchanger 24 to indoor coil 26 where the liquid refrigerant is evaporated with the vapor phase directed back to heat exchanger 24. In a heating mode, the direction of the phase-change refrigerant in the heat transfer coupling assembly 35 is reversed. If desired, the 4-way valve 18 and unidirectional pump may be replaced by a reversible pump, or the 4-way valve may be replaced with any suitable combination of 2-way and/or 3-way valves.

Figure 5:
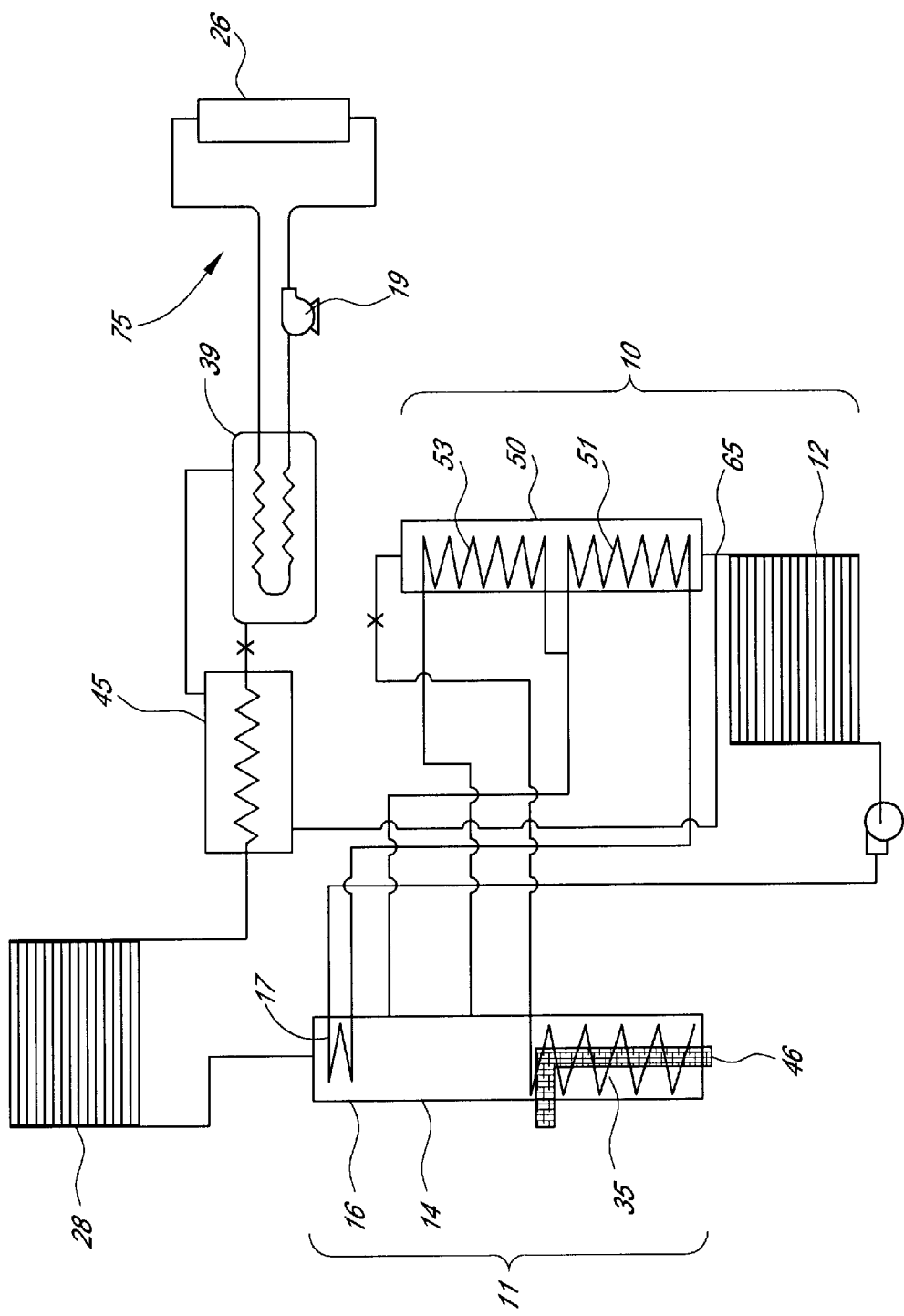
FIG. 5 schematically illustrates an aqua-ammonia GAX chiller having the phase-change heat transfer coupling of the invention.

FIG. 5 schematically illustrates an aqua-ammonia GAX (generator absorber heat exchange) chiller apparatus also incorporating the heat transfer coupling assembly 75 of the invention. The major components of the GAX chiller system include an absorber assembly 10 comprising an absorber 12 and an absorber heat exchange section 50 which includes an absorber heat exchanger 51 and a GAX heat exchanger 53. A generator assembly 11 includes a generator heat exchanger 35, boiler 46, adiabatic section 14 and a rectifier section 16. Condenser 28 condenses vaporized ammonia and directs it to a subcooler 45 for precooling the ammonia. The absorber and condenser heat exchangers may be air or water cooled whereas the rectifier 16 may be cooled by solution or water. A conventional GAX cooler is well known in the art, for example U.S. Pat. Nos. 5,490,393 and 5,367,884 and is also described in the aforesaid Modahl et al. Modahl et al. The descriptions of which are incorporated herein by reference. Operation of the conventional GAX chiller shown is specifically described in U.S. patent application Ser. No. 09/479,277 filed Jan. 5, 2000 (ROCKYR.99A), the description of which is incorporated herein by reference. The heat transfer coupling assembly 75 operates substantially as described in the previous drawings. The heat exchanger 39 acts as a condenser for the phase-change refrigerant which is condensed and the liquid pumped to indoor coil 26 by refrigerant pump 19. The indoor coil 26 acts as an evaporator to cool the load (conditioned space) to which it is exposed.

Figure 6:
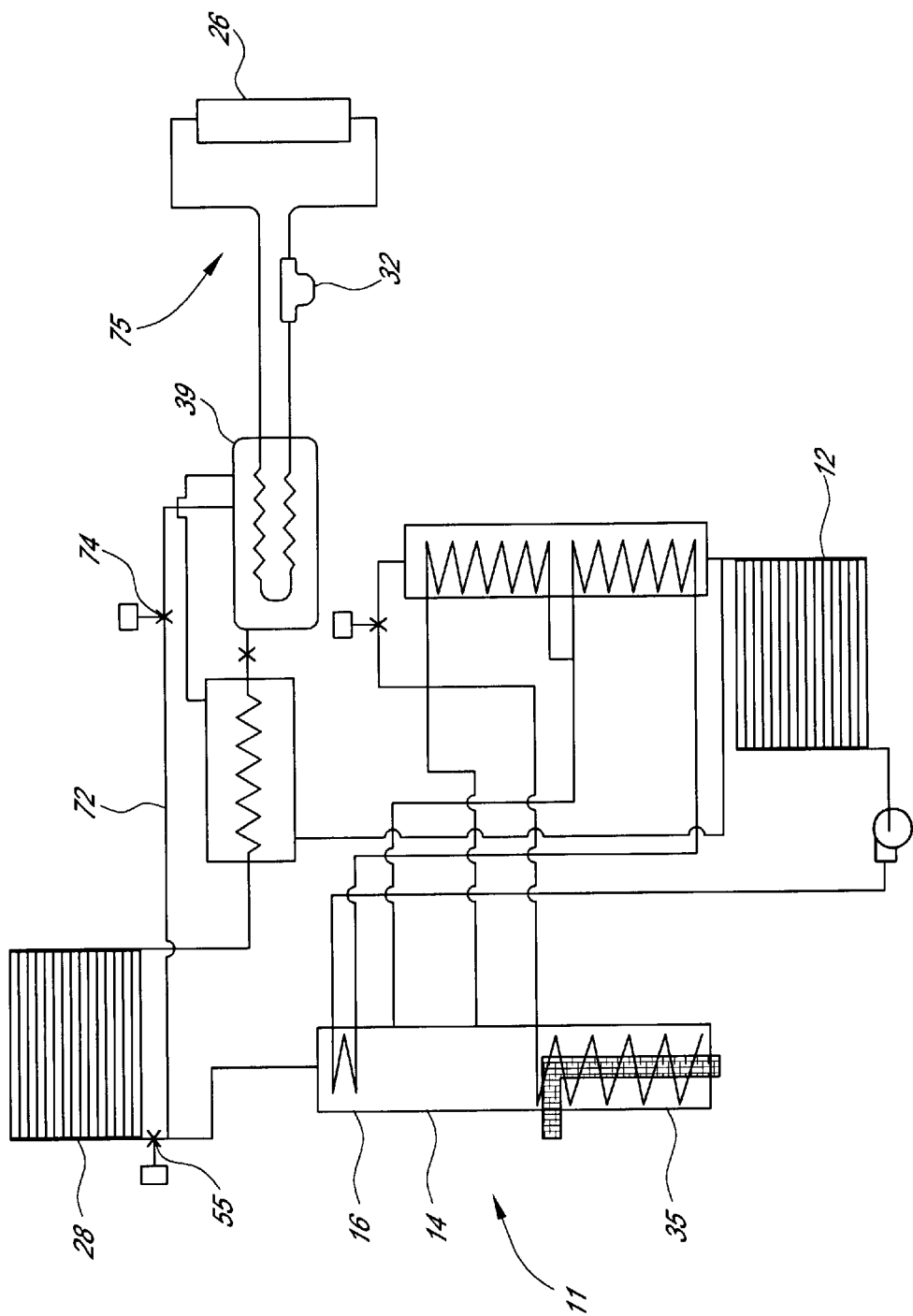
FIG. 6 is a schematic illustration of an aqua-ammonia GAX chiller/heater including the phase-change coupling with a refrigerant condenser by-pass.

In FIG. 6, there is illustrated a GAX chiller/heater system. The apparatus includes a by-pass operation whereby ammonia vapor from the generator 14 may bypass condenser 28 whereby the vaporized ammonia is directed via pipe 72 to heat exchanger 39. Operation of valve 55 selectively shuts off the ammonia flow to the condenser 28 and solenoid operated valve 74 selectively opens and closes the pipe 72. To provide a heating function, ammonia vapor from the generator passes to heat exchanger 39 which acts as a condenser for heating the vapor phase refrigerant in the heat transfer coupling assembly 75. The phase-change refrigerant in the heat transfer coupling is heated and vaporized in heat exchanger 39, with the refrigerant vapor passing to indoor coil 26, which acts as a condenser to provide heating to the space to which is exposed. A reversible 32 pump is used for pumping the liquid phase of the refrigerant in the heat transfer coupling assembly. Optionally, one or more reversing valves and unidirectional pump as shown in FIG. 4 may be used. To supply cooling to the indoor coil 26 which acts as an evaporator, the valves 55 and 74 will be operated selectively to allow ammonia vapor to pass through the condenser 28 whereby the by-pass pipe 72 is closed and the apparatus functions as a chiller like that illustrated and described in FIG. 5. Over-pumping of the phase change refrigerant will be carried out as described herein. Operation of the GAX-chiller/heater assembly components are fully described in the aforesaid Ser. No. 09/479,277 application, and incorporated herein by reference.

Figure 7:
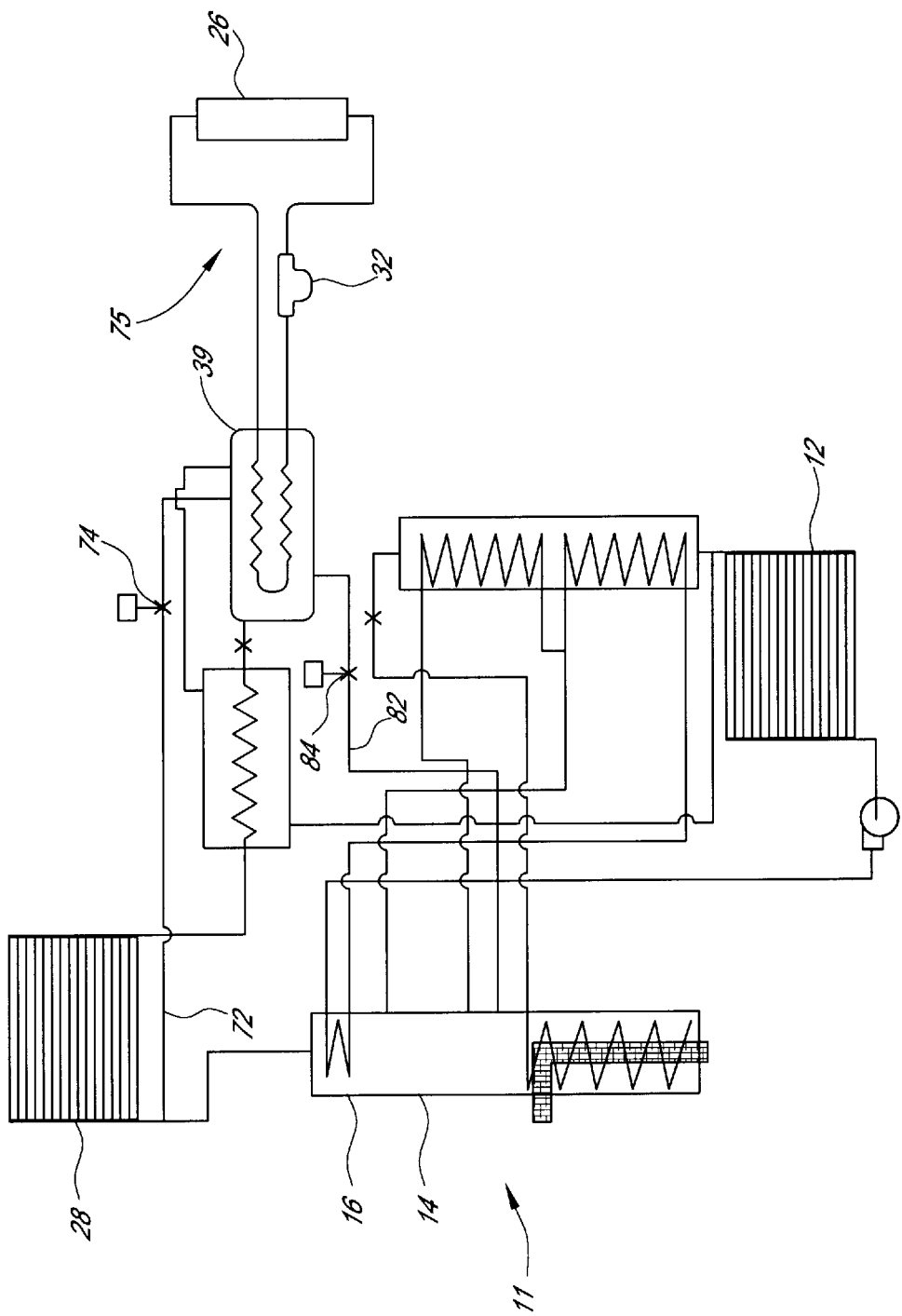
FIG. 7 illustrates another GAX chiller/heater apparatus including the phase-change coupling and using gravity refrigerant return to the generator.

FIG. 7 illustrates another embodiment of an integrated chiller-heater system in which gravity is used for returning ammonia refrigerant from heat exchanger 39 to the generator 16 via pipe 82 and solenoid operated valve 84, thus avoiding the need for a pump and the use of power for operating a pump for the ammonia. In a heating mode of operation, the condenser and absorber are not operated, nor is the absorption fluid pumped through the system. Instead, ammonia is simply heated and vaporized in the generator 16 and passed directly to the heat exchanger 39 via by-pass pipe 72 where it is condensed for supplying heat to the refrigerant in the heat transfer coupling assembly 75. Again, operation of the aqua-ammonia absorption system is fully described in the aforesaid application, Ser. No. 09/479,277 filed on Jan. 5, 2000 (ROCKYR.099A) and is incorporated herein by reference.

According to the invention, in the cooling or heating mode, more liquid phase-change heat transfer fluid is pumped to the indoor coil than is required to meet the heat load transfer at the indoor coil by refrigerant vaporization alone. Such a process, referred to as over-pumping, reduces the amount of heat transfer surface required to vaporize the phase-change refrigerant with fixed temperature approach and/or reduces pumping power, depending on how the process is optimized. As the heat transfer surface dries out in an indoor coil, heat transfer coefficients decrease requiring increases in the heat transfer surface. Liquid overpumping eliminates areas of dry-out in the indoor coil heat transfer surface. However, excessive over-pumping is to be avoided to prevent a decrease in heat transfer coefficients. According to the invention, the amount of liquid overpumping is between about 1% and about 100% and preferably about 2% to 25% excess liquid.

Likewise, in a heating mode, over pumping is useful in minimizing pumping power requirements. In a heating mode, phase-change refrigerant is condensed in the indoor coil and vaporized in the heat exchanger. Thus, in FIG. 6, in the heating mode, pump 32 will pump more liquid refrigerant from indoor coil 26 to heat exchanger 39 than will be vaporized in heat exchanger 39.

Figure 8:
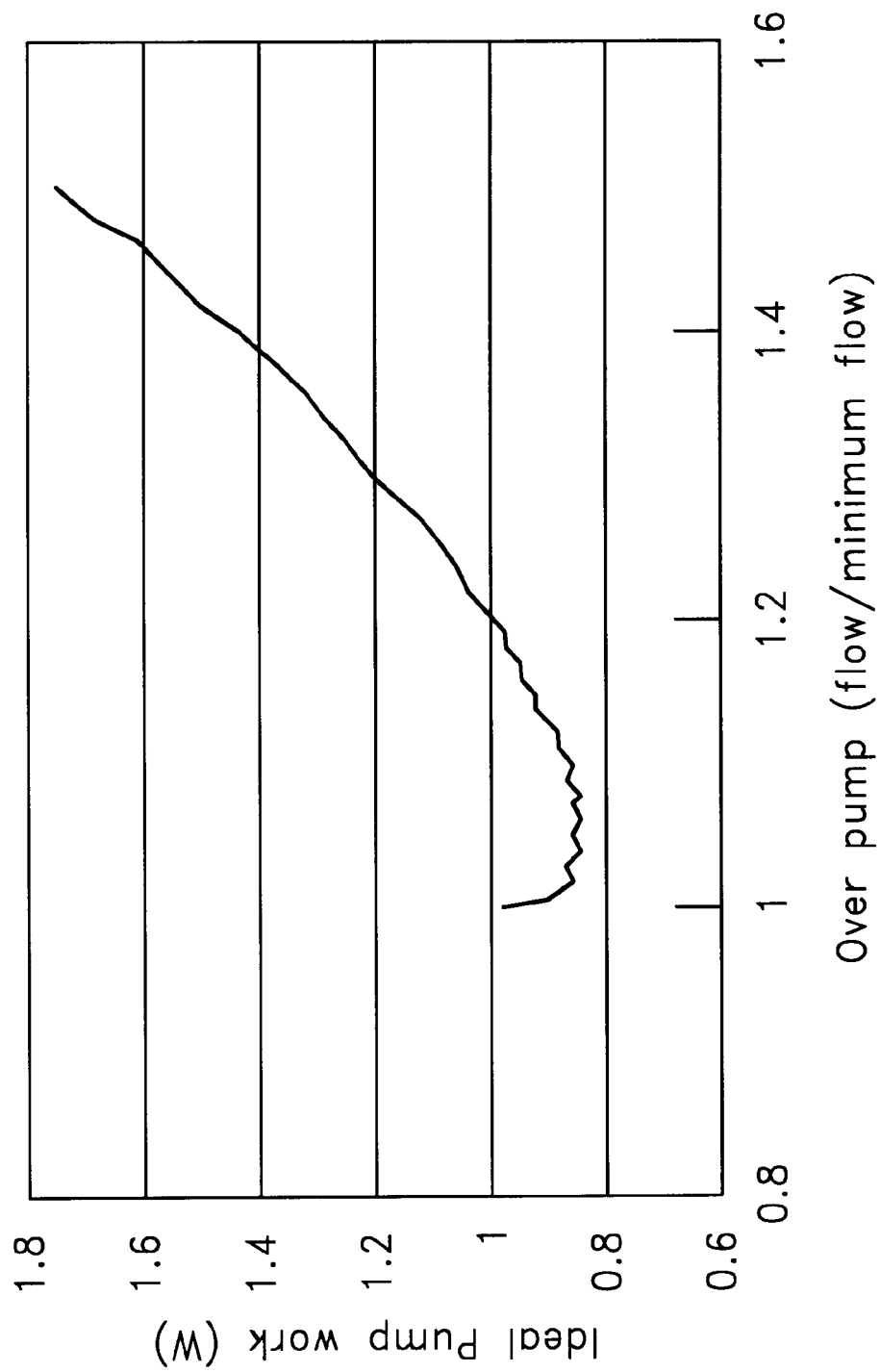
FIG. 8 is a graph illustrating the advantage of overpumping liquid phase-change refrigerant in a heat transfer coupling according to the invention.

Referring to FIG. 8, a graph illustrating the effect of liquid refrigerant over-pumping to the indoor coil during cooling mode operation is illustrated. FIG. 8 shows pump power required as a function of over-pumping. These data, based on analysis and specific for R22 refrigerant and particular coil and tubing sizes, show minimum pump power required in the range of 2 to 10% over pumping. The specific range of liquid refrigerant over-pumping depends on the heat transfer load requirements to be met by the indoor coil, phase-change fluid selection, coil design, and process temperatures. For example, if the selected phase-change refrigerant has a phase-change energy of 100 Btu/lb, a design load of 36,000 Btu/h, a minimum circulation rate of 360 lb/hr is necessary. However, more typically a circulation rate of 365 to 750 lb/hr will be used.

The specific phase-change refrigerants used in the heat transfer coupling include HFCs and HCFCs such as R22, R134a, R404a, R410a, R502, R123 and R507. Most refrigerants in common use in air conditioning systems (HVAC) will work for phase-change coupling, and it is desirable to use these refrigerants because they are readily commercially available, safe, compatible with normal piping materials, and are familiar to contractors and air conditioning engineers and technicians. Preferred refrigerants are ASHREA Safety Group A1 or A2 and UL Group 4, 5, and 6 refrigerant compositions. Use of such HVAC accepted refrigerants also ensures that pressures at cooling and heating temperatures are not excessively high or low. The use of the phase-change heat transfer coupling according to the present invention is advantageous over hydronic systems incorporating solutions of water and ethylene glycol or propylene glycol or other antifreeze liquids. As previously discussed, the electrical power requirements for pumping a phase-change refrigerant to the indoor coil are substantially lower. Because homes with central air conditioning or heat pumps are typically equipped with an indoor coil sized for vaporization of refrigerants, and piping connections between an outdoor unit and the indoor coil are also sized and designed for transport of phase-change refrigerants, retrofit costs are substantially lower. Commonly, existing piping in the home can be used for the phase-change heat transfer coupling with the aqua-ammonia air conditioning or heat pumps used in the systems of the present invention. Moreover, in addition to using existing piping, the existing indoor coil may be used as well, although some modifications may be required, such as removal of the expansion device (refrigerant restrictor) and modifications in the distributor. However, even if the existing indoor coil cannot be used, retrofit may be economically and conveniently accomplished by simply replacing the indoor coil, while utilizing existing piping between the outdoor unit and new indoor coil.

Different heat exchanger designs and structures may be used in the heat transfer coupling of the assembly. For example, the heat exchanger selected may be a tubes-in a-tube design comprising a plurality of inner tubes aligned substantially parallel to the axis of a larger outer tube. Such a design is relatively inexpensive and has an advantage of low pressure drop within the heat exchanger. Referring to FIG. 1, the vapor phase of the non-ammonia phase-change refrigerant used in the heat transfer coupling 35 will be directed counter-current to the condensed ammonia refrigerant from reservoir 22 which becomes vaporized as it passes through the heat exchanger. Another useful heat exchanger design is a tube-in-a-tube version utilizing a single inner tube extending coaxially with an outer tube. The disadvantage of tube-in-a-tube type heat exchangers is that a substantial length of the tubing may be required to adequately exchange heat between the fluids. Typically, the length is much greater than the diameter of the outer tube. The length to diameter ratio is usually at least about 200. Yet another type of heat exchanger is a coil tube in a shell heat exchange structure. In this design, one fluid travels along the inner coiled tube which extends along the annular interior of a shell through which the other fluid passes. Another heat exchanger uses a twisted tube design in which an inner tube is twisted and extends coaxially within an outer tube. A plate-type heat exchanger design incorporating a plurality of plates aligned generally parallel to one another between cover plates may also be used. Such a heat exchanger is compact and thus useful where space requirements are limited. A disadvantage is the thermal stress through the heat exchange components where a wide operating temperature range is required. Other heat exchanger designs may also be used within the purview of the invention. The selection of the heat exchange design to be used will be evident by those skilled in the art taking into consideration the respective advantages and disadvantages.

What is claimed is:

1. In a process for operating an aqua-ammonia absorption cooling system or heating and/or cooling system for supplying cooling or heating to an indoor space, said system comprising:

a heat exchange assembly having a first heat exchanger exterior to the indoor space to be heated and/or cooled, a second heat exchanger in heat transfer exposure with the interior of said indoor space, piping in flow communication with said first and second heat exchangers and having a phase-change refrigerant other than ammonia therein, and a pump for pumping the liquid phase-change refrigerant between said first and second heat exchangers, an improvement comprising pumping more of the liquid phase-change refrigerant from the heat exchanger in which refrigerant condensation occurs to the heat exchanger in which refrigerant vaporization occurs than is required to meet the heat load transfer in said heat exchanger for vaporizing said phase-change refrigerant alone.

2. The process of claim 1 wherein the amount of liquid phase-change refrigerant pumped to the phase-change refrigerant vaporizing heat exchanger is between about 1% and about 100% more than required to meet the heat load transfer therein.

3. The process of claim 1 wherein the amount of liquid phase-change refrigerant pumped to the phase-change refrigerant vaporizing heat exchanger is between about 2% and about 25% more than required to meet the heat load transfer therein.

4. The process of claim 1 comprising pumping a fluorocarbon or a chlorofluorocarbon phase-change refrigerant, or mixtures thereof.

5. An apparatus for carrying out the process of claim 1 wherein the absorption system is an aqua-ammonia chiller comprising an absorber assembly and a generator assembly, wherein said first heat exchanger comprises a condenser for said phase-change refrigerant and said second heat exchanger comprises an evaporator for said phase-change refrigerant to provide cooling to the indoor space, and wherein said improvement comprises pumping more phase-change refrigerant to said second heat exchanger than is required therein for cooling the indoor space.

6. An apparatus for carrying out a process of claim 1 wherein said absorption system is an aqua-ammonia chiller comprising a generator and an absorber assembly comprising an absorber, an absorber heat exchanger and a generator/absorber heat exchanger, and including piping for directing at least a portion of ammonia rich absorption fluid from said absorber to said absorber heat exchanger and therefrom to said generator, and apparatus for transferring thermal energy from the generator/absorber heat exchanger to the generator, wherein said first heat exchanger comprises a condenser for said phase-change refrigerant and said second heat exchanger comprises an evaporator for said phase-change refrigerant to provide cooling to the indoor space, and wherein said improvement comprises pumping more phase-change refrigerant to said second heat exchanger than is required therein for cooling the indoor space.

7. An apparatus for carrying out the process of claim 1 wherein the absorption system is an aqua-ammonia heater comprising an absorber assembly and a generator assembly, wherein said first heat exchanger comprises an evaporator for said phase-change refrigerant and said second heat exchanger comprises a condenser for said phase-change refrigerant to provide heating to the indoor space, and wherein said improvement comprises pumping more phase-change refrigerant from said second heat exchanger to said first heat exchanger than is required for vaporizing the phase-change refrigerant therein to meet the heat transfer load for supplying heat to the indoor space.

8. An apparatus for carrying out a process of claim 1 wherein said absorption system is an aqua-ammonia heater comprising a generator and an absorber assembly comprising an absorber, an absorber heat exchanger and a generator/absorber heat exchanger, and including piping for directing at least a portion of ammonia rich absorption fluid from said absorber to said absorber heat exchanger and therefrom to said generator, and apparatus for transferring thermal energy from the generator/absorber heat exchanger to the generator, wherein said first heat exchanger comprises an evaporator for said phase-change refrigerant and said second heat exchanger comprises a condenser for said phase-change refrigerant to provide heating to the indoor space, and wherein said improvement comprises pumping more phase-change refrigerant from said second heat exchanger to said first heat exchanger than is required for vaporizing the phase-change refrigerant therein to meet the heat transfer load for supplying heat to the indoor space.

9. An apparatus for carrying out a process of claim 1 wherein said aqua-ammonia absorption system is a heat pump comprising:
   an absorber assembly, a generator assembly, and an absorption fluid loop for directing absorption fluid between said absorber assembly and said generator assembly,
   a phase-change refrigerant heat exchange assembly for selectively providing heating and cooling to the indoor space to be conditioned comprising a first heat exchanger exterior to said indoor space and a second heat exchanger in heat transfer exposure to said indoor space and capable of selectively functioning as an evaporator and a condenser, a pump for circulating liquid phase-change refrigerant, and apparatus for reversing the direction of circulation through the phase-change heat exchange assembly,
      apparatus for exchanging heat between said aqua-ammonia absorption system and said first heat exchanger, and
      a cycle reversing apparatus comprising one or more valves and/or pumps cooperating with a refrigerant loop for selectively reversing the aqua-ammonia absorption cycles,
   wherein said first and said second heat exchangers are capable of functioning as a condenser and an evaporator for said phase-change refrigerant to provide heating or cooling to the indoor space, and wherein said improvement comprises pumping more liquid phase-change refrigerant to said first or said second heat exchanger than is required to be vaporized therein for heating or cooling the indoor space, respectively.

10. An apparatus of claim 9 wherein said absorber assembly comprises an absorber, an absorber heat exchanger and a generator/absorber heat exchanger, and including piping for directing at least a portion of ammonia rich absorption fluid from said absorber to said absorber heat exchanger and therefrom to said generator, and apparatus for transferring thermal energy from the generator/absorber heat exchanger to the generator.

11. An apparatus for carrying out a process of claim 1 wherein said aqua-ammonia absorption system comprises:
   an absorber assembly, a generator assembly, and an absorption fluid loop for directing absorption fluid between said absorber assembly and said generator assembly,
   a heat exchange assembly for selectively providing heating and cooling to an indoor space to be conditioned comprising a first heat exchanger exterior to said indoor space and a second heat exchanger in heat transfer exposure to said indoor space and capable of selectively functioning as an evaporator and a condenser,
   an outdoor coil comprising a third heat exchanger capable of selectively functioning as an evaporator and a condenser,
   a first refrigerant loop for directing ammonia between said first heat exchanger, said outdoor coil, said absorber and said generator, and
   a second refrigerant loop containing a phase-change refrigerant other than ammonia between said first heat exchanger and said second heat exchanger, and a pump capable of pumping more liquid phase-change refrigerant to said second heat exchanger than is required to meet the heat exchange load transfer therein.

12. An apparatus of claim 11 including a reservoir for condensed ammonia and wherein said first refrigerant loop includes piping for directing condensed ammonia from said outdoor coil to said reservoir and from said reservoir to said first heat exchanger.

13. An apparatus of claim 11 including a reversing valve cooperating with said first refrigerant loop for selectively directing ammonia to said first or said outdoor coil and for directing ammonia from said first heat exchanger or said outdoor coil to the absorber.

14. An apparatus of claim 13 wherein said reversing valve comprises a four-way valve.

15. An apparatus of claim 11 wherein said absorber assembly comprises an absorber, an absorber heat exchanger and a generator/absorber heat exchanger, and including piping for directing at least a portion of ammonia rich absorption fluid from said absorber to said absorber heat exchanger and therefrom to said generator, and apparatus for transferring thermal energy from the generator/absorber heat exchanger to said generator.

16. An apparatus of claim 11 wherein said pump is a reversible pump.

17. An apparatus of claim 11 wherein said second refrigerant loop includes one or more reversing valves and wherein said pump is a unidirectional pump.

18. An apparatus for carrying out the process of claim 1 wherein said aqua-ammonia absorption system is a chiller/heater comprising:
   an absorber assembly,
   a generator assembly,
   an absorption fluid loop for directing absorption fluid between said absorber and generator assemblies, said absorption fluid loop comprising first piping for directing ammonia rich absorption fluid from said absorber assembly to said generator assembly and second piping for directing ammonia weak absorption fluid from said generator assembly to said absorber assembly, a condenser, a first heat exchanger for selectively functioning as a condenser or an evaporator, a first refrigerant loop for directing ammonia between said generator assembly, condenser, first heat exchanger and absorber assembly, refrigerant by-pass piping for directing ammonia from said generator assembly to said first heat exchanger without passing through said condenser, and a second refrigerant loop for directing a phase-change refrigerant other than ammonia, and for selectively providing heating and cooling to an indoor space to be conditioned, said second loop comprising a second heat exchanger in heat transfer exposure to said indoor space and capable of selectively functioning as an evaporator and a condenser.

19. An apparatus of claim 18 including one or more operable valves cooperating with said refrigerant by-pass piping for selectively opening and closing said by-pass piping.

20. An apparatus of claim 18 wherein said absorber assembly comprises an absorber and an absorber heat exchanger and wherein said absorption fluid loop directs absorption fluid in heat transfer communication in said absorber heat exchanger and therefrom to said generator assembly.

21. An apparatus of claim 18 wherein said absorber assembly comprises an absorber, an absorber heat exchanger and a generator/absorber heat exchanger and wherein said absorption fluid loop directs at least a portion of ammonia rich absorption fluid to said absorber heat exchanger and therefrom to said generator, and apparatus for transferring thermal energy from the generator/absorber heat exchanger to said generator.

22. An apparatus of claim 18 wherein said first heat exchanger is elevated above said generator assembly to provide gravity flow of condensed refrigerant from said first heat exchanger to said generator assembly via said refrigerant conduit.

23. An apparatus of claim 22 including one or more operable valves cooperating with said refrigerant by-pass piping for selectively opening and closing said by-pass piping.

24. An apparatus of claim 6, 8, 10, 15 or 21 wherein said apparatus for transferring thermal energy from said generator/absorber heat exchanger to the generator comprises piping for routing a portion of the ammonia-rich absorption fluid through the generator/absorber heat exchanger before it is routed to the generator.

* * * * *